(12) United States Patent
Dupuis et al.

(10) Patent No.: US 7,185,724 B2
(45) Date of Patent: Mar. 6, 2007

(54) BATTERY SUPPORT STRUCTURE

(75) Inventors: Larry Dupuis, Grosse Ile, MI (US);
Dragan Stojkovic, Southgate, MI (US);
Matt Happy, Waterford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 200 days.

(21) Appl. No.: 10/708,981

(22) Filed: Apr. 5, 2004

(65) Prior Publication Data

US 2005/0224268 A1    Oct. 13, 2005

(51) Int. Cl.
*B60R 16/04*    (2006.01)

(52) U.S. Cl. .................. 180/68.5; 296/205; 429/100

(58) Field of Classification Search .................. None
See application file for complete search history.

(56) References Cited

U.S. PATENT DOCUMENTS

| | | | |
|---|---|---|---|
| 2,664,308 A * | 12/1953 | Appel | 454/159 |
| 3,989,118 A * | 11/1976 | Hansen | 180/68.5 |
| 4,013,300 A * | 3/1977 | Berger | 280/834 |
| 4,086,860 A * | 5/1978 | Kosrow et al. | 112/153 |
| 4,453,763 A | 6/1984 | Richards | |
| 5,106,148 A | 4/1992 | Ikeda et al. | |
| 5,547,036 A * | 8/1996 | Gawaskar et al. | 180/68.5 |
| 5,975,625 A | 11/1999 | Simplicean | |
| 6,085,854 A * | 7/2000 | Nishikawa | 180/68.5 |
| 6,109,380 A | 8/2000 | Veenstra | |
| 6,402,229 B1 * | 6/2002 | Suganuma | 296/203.02 |
| 6,416,119 B1 | 7/2002 | Gericke et al. | |
| 6,521,371 B1 | 2/2003 | Lavanture | |
| 6,540,284 B2 * | 4/2003 | Miyata | 296/203.02 |
| 6,699,616 B2 * | 3/2004 | Wu | 429/98 |
| 6,769,178 B1 * | 8/2004 | Beckman | 29/897.2 |
| 2002/0079153 A1 | 6/2002 | Durand | |

* cited by examiner

*Primary Examiner*—Christopher Bottorff
(74) *Attorney, Agent, or Firm*—Fredrick V. Owens

(57) ABSTRACT

A vehicle support structure for supporting engine compartment accessories such as a battery. The support structure includes a first tubular frame member having a transversely extending portion and a longitudinally extending portion that partially encompass an accessory tray. A second tubular frame member disposed at least in part adjacent to the first tubular frame member and having a transversely extending base support portion that extends below the accessory tray. The accessory tray is secured to the first tubular frame member and overlies the base support portion of the second tubular frame member. The structure reduces the weight and number of parts required to support accessories.

10 Claims, 2 Drawing Sheets

BATTERY SUPPORT STRUCTURE

BACKGROUND OF INVENTION

1. Field of the Invention

The present invention relates to vehicle front end battery support structures. More specifically, battery support structures constructed from a tubular material for supporting a battery within the engine compartment.

2. Background Art

Light and medium duty vehicles powered by a combustion engine often use lead acid batteries to store energy for operating electrical accessories. The battery is usually carried in a receptacle or a tray located within the vehicle's engine compartment. In most light duty vehicles, the tray is supported by a sheet metal structure that is generally secured to the frame or body panel within the front end assembly.

Conventional front end assemblies are often made by stamping and welding together several individual frame components. As each of the frame parts are attached to form subassemblies and then are attached to the body portion of the vehicle, it becomes more costly to assemble and increases the weight of the front end without enhancing the structure. The additional costs include plant assembly complexity and additional fasteners.

Hydroformed tubular elements are increasingly being used in the construction of vehicle front end structures. Hydroforming is a metal forming process that uses high pressure fluids to outwardly expand tubular blanks to conform with the surfaces of a die cavity of a die assembly to form a contoured hydroformed part. The walls of hydroformed members are uniformly work hardened and result in higher strength parts. Although a number of prior art inventions describe the use of tubular members in hybrid front end assemblies, few have taken full advantage of the opportunities available.

To ensure safe operation of the vehicle, the battery support structure is often large and of sufficient mass to create packaging challenges within engine compartment. In addition, medium and heavy duty vehicle applications often require a second battery and its corresponding sheet metal structure to meet the operating needs of the vehicle. The additional weight associated with the battery support structure can exceed vehicle weight targets set for improving fuel economy in the light duty and medium duty truck segment. Therefore, there exists a need in the industry for a battery support structure that safely supports a battery, which minimizes its impact on packaging within the engine compartment, and adds minimal weight to the vehicle.

SUMMARY OF INVENTION

The present invention provides a vehicle support structure for storing engine compartment accessories. The vehicle support structure includes a first tubular frame member having a transversely extending portion and a longitudinally extending portion, a second tubular frame member disposed at least in part adjacent to the first tubular frame member and having a transversely extending base support portion that is spaced rearwardly from the transversely extending portion of the first tubular frame member, and an accessory tray secured to the first tubular frame member and to the base support portion of the second tubular frame member.

DETAILED DESCRIPTION

The present invention is a battery support structure for a front end assembly. The battery support structure may be used for to support the battery or another engine compartment accessory for any type of vehicle.

Figure 1:
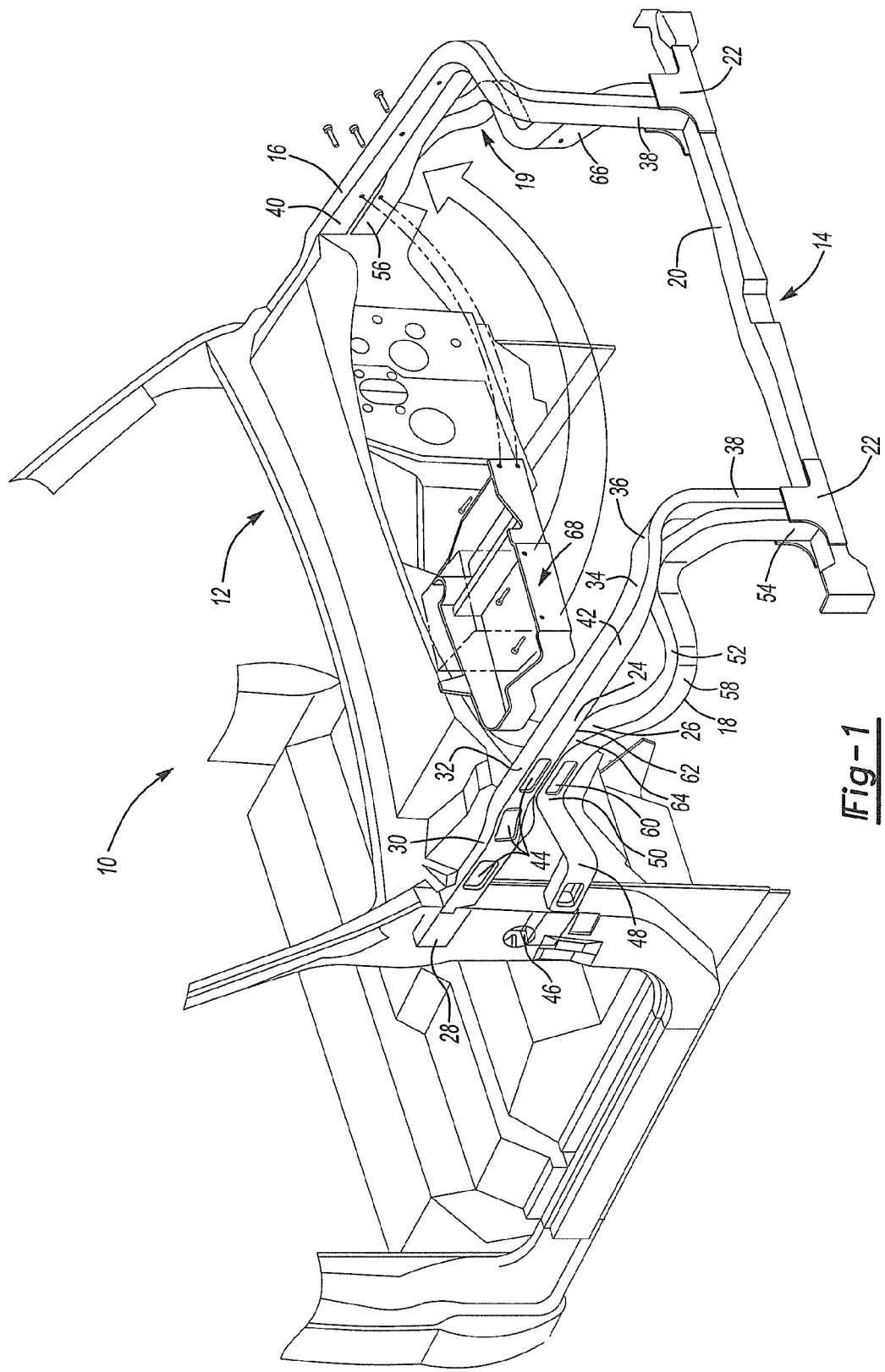
FIG. 1 is a perspective view of a vehicle support structure for front end assembly with a battery tray positioned above its final location according to one embodiment of the present invention.

Referring to FIG. 1, a front end structure for a vehicle is generally identified by reference numeral 10. The front end structure 10 comprises a body portion 12 and a U-shaped tubular structure 14. The U-shaped tubular structure 14 comprises a left side tube structure 16, a right side tube structure 18 and a radiator tube support structure 20. Right and left side designations as used herein refer to the sides of the vehicle relative to the driver of the vehicle. The side tubes 16, 18 are mirror images of each other. Each side tube structure 16,18 extends in a longitudinal direction generally in front of the body portion 12 to the radiator support structure 20. Each side tube structure 16,18 defines a battery support structure. The radiator support 20 generally extends transversely across the front of the vehicle and perpendicular to the longitudinal direction of the side tube structures 16 and 18. Each side tube structure is independently connected to the radiator tube 20 by a U-shaped bracket 22.

The left and right side tube structures each comprise an upper tube 24 and a lower tube 26. Each upper tube 24 comprises a body end 28, a first connecting point 30, a second connecting point 32, a battery support portion 34, an upper cooling portion 36, and a front end 38. The upper tube 24 has an inboard surface 40 and an outboard surface 42. The outboard surface 42 has a plurality of access holes 44 that provide clearance for front end assembly as well as performing securing operations. The upper tube 24 extends from a higher relative vertical position to a lower vertical position between the upper cooling portion 36 and the front end 38. The front end 38 is attached to the radiator support 20.

Each lower tube 26 of the left and right side tube structures, comprises a body end 46, a first connecting point 48, a second connecting point 50, a battery support portion 52, and a front end 54. Each lower tube 26 has an inboard surface 56 and an outboard surface 58. The lower tube has a plurality of access holes 60 that provide access for installation, welding, or other assembly operations associated with the assembly of the front end.

The lower tube 26 and the upper tube 24 are secured together to form each of the battery support structures 19. In FIG. 1, a bottom surface 62 of the upper tube 24 and a top surface 64 of the lower tube 26 are secured to each other along with the upper second connecting point 32 and the lower connecting point 50 being disposed in close proximity to each other. Furthermore, an in-board surface 66 of the lower tube 26 and an outboard surface 42 of the upper tube 24 are secured together adjacent to the upper tube front end 38 and the lower tube front end 54, respectively. The upper tubes 24 and the lower tubes 26 extend longitudinally toward the front of the vehicle and are fixedly connected to each other prior to being attached to the radiator support tube 20. The upper tube 24 is formed to be inboard of the lower tube 26 such that the upper tube front end 38 is disposed in a vertical plane inboard of the upper body end 28. Similarly, the lower tube front end 54 is located in a vertical plane more in-board than the lower tube body end 46. A battery tray 68 for supporting a battery 69, shown in phantom, directly above the upper battery support 34 and lower battery support 52.

Figure 2:
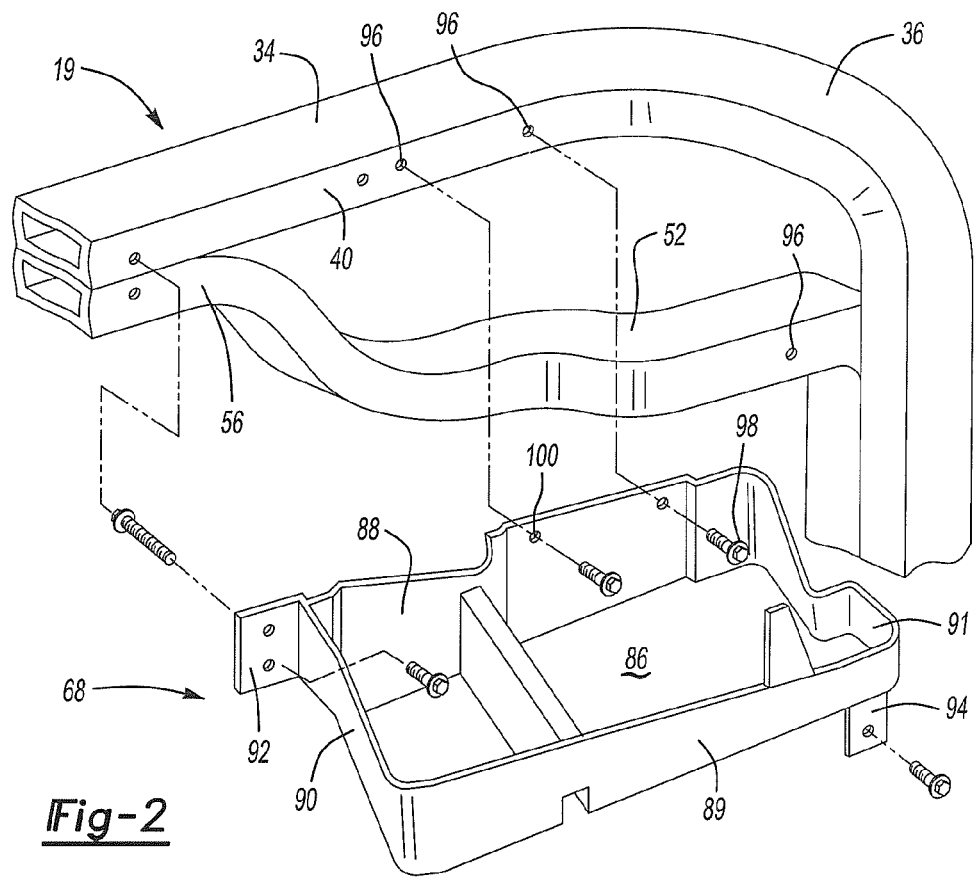
FIG. 2 is an exploded perspective view of the vehicle support structure and a battery tray.

Referring to FIG. 2, one embodiment of the battery support structure 19 is shown. The battery tray 68 generally has a rectangular shape and includes a floor 86, a pair of opposing side walls 88 and 89 and a pair of opposing end walls 90 and 91. The side walls 88, 89 and the end walls 90, 91 project substantially in vertical planes. A portion of the side walls 88, 89 may extend beyond the end walls 90, 91 or the bottom 86 to form a side wall securing flange 92 and a lower support securing flange 94.

Figure 3:
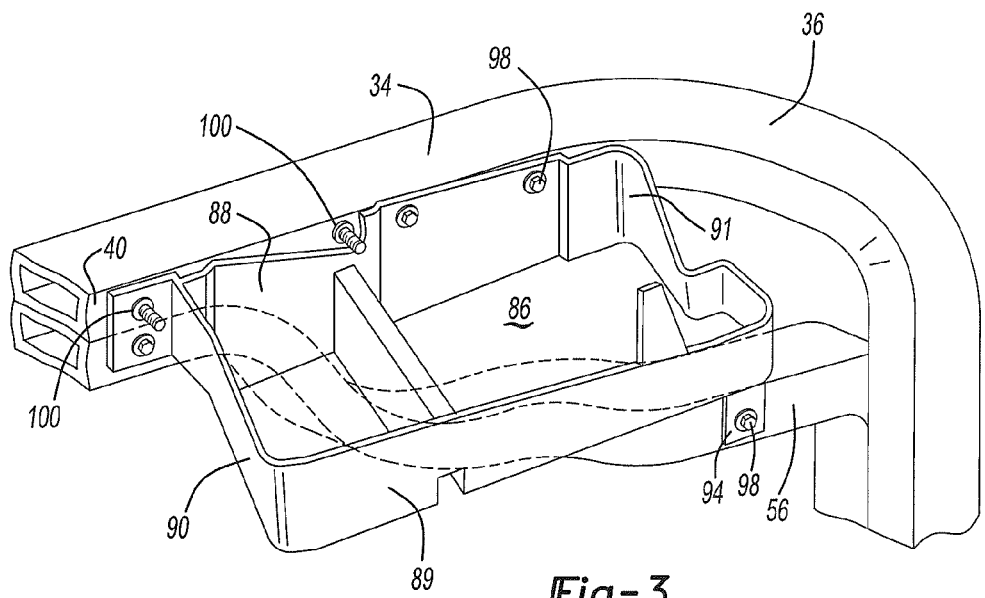
FIG. 3 is a perspective view of the vehicle support structure and battery tray.

Referring to FIGS. 2 and 3, the battery tray 68 is shown in its final position. The lower battery support 52 supports the tray bottom 86. The upper and lower tubes 40, 56 have a plurality of securing holes 96. A plurality of bolts 98 extend through a plurality of clearance holes 100 located in the battery tray 68 and secure the battery tray firmly to the battery support portions 34 and 52.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

The invention claimed is:

1. A support structure for storing accessories in an engine compartment of a vehicle having a frame, comprising:
   a first tubular member forming a part of the frame;
   a second tubular member forming a part of the frame, the second tubular member being disposed at least in part adjacent to the first tubular member and having a base support portion; and
   an accessory tray having a supporting surface and at least two upstanding walls, wherein the accessory tray is fastened to a side wall of the first tubular member and wherein the accessory tray is fastened to the base support portion of the second tubular member by a lower support securing flange.

2. The support structure of claim 1, wherein the tubular members are hydroformed.

3. The support structure of claim 1, wherein the accessory tray has a base portion fastened to an inboard surface of the base support portion.

4. The support structure of claim 1, wherein the accessory tray has a front wall and a transverse side wall adjacent to the first tubular member.

5. A battery support assembly for a vehicle, comprising:
   a first tubular member that forms part of a frame of the vehicle, the first tubular member having a transversely extending portion and a longitudinally extending portion;
   a second tubular member that forms part of the frame of the vehicle, the second tubular member being disposed at least in part adjacent to the first tubular member and having a transversely extending base support portion that is spaced rearwardly from the transversely extending portion of the first tubular member; and
   a battery tray having a supporting surface and at least two upstanding side walls, wherein the battery tray is fastened to the longitudinally extending portion by one upstanding side wall, wherein the battery tray is fastened to the longitudinally extending portion of the first tubular member by another upstanding side wall, and wherein the battery tray is fastened to the base support portion of the second tubular member.

6. The battery support assembly of claim 5, wherein the tubular frame members are hydroformed.

7. The battery support assembly of claim 5, wherein the battery tray has a base portion fastened to the base support portion.

8. The battery support assembly of claim 5, wherein the battery tray has a front wall adjacent to the longitudinally extending portion and a transverse side wall adjacent to the first tubular frame member transverse extending portion.

9. A battery support structure for a vehicle having at least one battery, comprising:
   a battery tray having a battery supporting surface and a plurality of upstanding walls;
   a first tubular frame member forming part of a frame of the vehicle;
   a second tubular frame member forming part of the frame of the vehicle and being fastened to the first tubular frame member;
   the first and second tubular frame members defining a plurality of side wall supports and a base support, the battery supporting surface of the battery tray being supported by the base support and at least one of the upstanding walls being fastened to one of the side wall supports.

10. A battery support structure for a vehicle having at least one battery, comprising:
   a first tubular frame member forming part of a front end of the vehicle;
   a second tubular frame member forming part of the front end of the vehicle and being fastened to the first tubular frame member;
   a tray support being defined by the first and second tubular frame members, the tray support defining a lower portion and a side portion; and
   a battery tray having a battery supporting surface and a plurality of upstanding side walls, the battery supporting surface overlying the lower portion and at least one of the plurality of upstanding side walls are fastened to the side portion.

* * * * *